(12) United States Patent
von Wiegand et al.

(10) Patent No.: US 7,082,570 B1
(45) Date of Patent: Jul. 25, 2006

(54) DISTRIBUTED HAPTIC INTERFACE SYSTEM AND METHOD

(75) Inventors: Thomas E. von Wiegand, Somerville, MA (US); Jonathan D. Pfautz, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 678 days.

(21) Appl. No.: 10/230,850

(22) Filed: Aug. 29, 2002

(51) Int. Cl.
*G06F 17/00* (2006.01)
*G09G 5/08* (2006.01)

(52) U.S. Cl. ............. 715/702; 715/701; 345/156; 345/161; 463/30

(58) Field of Classification Search ......... 715/701, 715/702; 345/156, 161; 463/30
See application file for complete search history.

(56) References Cited

U.S. PATENT DOCUMENTS

| | | | | |
|---|---|---|---|---|
| 5,184,319 | A | 2/1993 | Kramer | 310/330 |
| 5,576,727 | A * | 11/1996 | Rosenberg et al. | 345/179 |
| 5,583,478 | A | 12/1996 | Renzi | 703/5 |
| 5,694,013 | A * | 12/1997 | Stewart et al. | 318/561 |
| 5,709,219 | A | 1/1998 | Chen et al. | 340/407.1 |
| 5,844,392 | A * | 12/1998 | Peurach et al. | 318/568.17 |
| 5,973,441 | A | 10/1999 | Lo et al. | 600/595 |
| 6,275,213 | B1 * | 8/2001 | Tremblay et al. | 345/156 |
| 6,362,729 | B1 | 3/2002 | Hellmann et al. | 340/436 |
| 6,424,333 | B1 * | 7/2002 | Tremblay et al. | 345/156 |
| 6,714,213 | B1 * | 3/2004 | Lithicum et al. | 715/701 |
| 2002/0030663 | A1 | 3/2002 | Tierling et al. | 345/156 |

FOREIGN PATENT DOCUMENTS

| | | |
|---|---|---|
| EP | 0348691 | 6/1989 |
| WO | 9520787 | 1/1995 |
| WO | 9520788 | 8/1995 |
| WO | 0124158 | 4/2001 |

OTHER PUBLICATIONS

BJ Fogg, et al., "HandJive: A Device for Interpersonal Haptic Entertainment," pp. 57-64, 1998.*
Ryan Traylor and Hong Z. Tan, "Development of a Wearable Haptic Display for Situation Awarness in Altered-gravity Environment: Some Initial Findings," Haptics 2002, IEEE.*
David J. Sturman, et al., Hands-on Interaction With Virtual Environments, pp. 19-24, 1989 ACM.*
Grigore C. Burdea, "Haptic Issues in Virtual Environments," IEEE, 2000.*

(Continued)

*Primary Examiner*—Tadesse Hailu
(74) *Attorney, Agent, or Firm*—Daly, Crowley, Mofford & Durkee, LLP

(57) ABSTRACT

A reconfigurable haptic interface includes at least one pod adapted to be removeably mounted on one or more portions of a moveable object. The at least one pod includes at least one actuator adapted to communicate with the one or more portions of the moveable object. The system further includes a plurality of transmitter/receiver units, which are in a communication relationship with the at least one pod. The plurality of transmitter/receiver units detect and communicate relative position information of the at least one pod to a host computer. The host computer processes the relative position information of the at least one pod to control actuation of the at least one actuator located on the at least one pod.

24 Claims, 5 Drawing Sheets

OTHER PUBLICATIONS

Christopher R. Wagner, S.J. Lederman, Robert D. Howe, A Tactile Shape Display Using RC Servomotors, Mar. 24-25, 2002, 2 Pages.

Sevgi Ertan, Pietro Russo, Abigail Willets (vest), Hong Tan, Claire Lee, Tactile Directional Display, Feb. 12, 2002 2 Pages.

Gary A. Zets, Vibrotactile Transducers: Utilizing Tactile Displays to Improve Performance in Spatial Tasks in Aerospace, Land and Sea Environments, Feb. 12, 2002, 3 Pages.

Henricus A.H.C. van Veen & Jan B.F. van Erp, Tactile Information Presentation In The Cockpit, 2000, 4 Pages.

Hong Tan, Adrian Lim and Ryan Traylor, A Psychophysical Study of Sensory Saltation with an Open Response Paradigm, 2000, 7 Pages.

Jody L. Wood, Information Systems for Navy Divers and Autonomous Underwater Vehicles Operating in Very Shallow Water and Surf Zone Regions, 1999, 1 Page.

Capt. Angus Rupert, MC USN, M.D., Ph.D., Information Through the Sense of Touch, Feb. 10, 2002, 3 Pages.

Louise Knapp. Lost? Go Vest, Young Man, Jun. 8, 2001, 3 Pages.

* cited by examiner

DISTRIBUTED HAPTIC INTERFACE SYSTEM AND METHOD

STATEMENT REGARDING FEDERALLY SPONSORED RESEARCH

This invention was made with government support under Grant Number N00014-01-1-0197, awarded by the U.S. Navy. The government has certain rights in the invention.

FIELD OF THE INVENTION

The present invention relates generally to a distributed haptic interface system and method and, more specifically, to a distributed haptic interface system and method for reconfiguring the system for adaptation to a number of virtual reality applications.

BACKGROUND

Virtual reality systems provide users with the illusion that they are part of a "virtual" environment. A virtual reality system typically includes a computer processor, such as a personal computer or workstation, specialized virtual reality software, and virtual reality I/O devices such as head mounted displays, sensor gloves, three dimensional ("3D") pointers, etc. These devices sense movement of a human body through a variety of sensors, and send signals to the computer processor to indicate the position and/or orientation of the human body in the virtual environment.

One common use for virtual reality systems is for training. In many fields, such as aviation, military and vehicle systems operation, virtual reality systems have been used successfully to allow a user to learn from and experience a realistic "virtual" environment. The appeal of using virtual reality systems for training relates, in part, to the ability of such systems to allow trainees the luxury of confidently operating in a highly realistic environment and making mistakes without "real world" consequences. Thus, for example, a trainee pilot or automobile driver can learn to operate a vehicle using a virtual reality simulator without concern for accidents that would cause injury, death and/or property damage in the real world. Similarly, operators of complex systems, e.g., nuclear power plants and weapons systems, can safely practice a wide variety of training scenarios that would risk life or property if performed in reality. In addition, virtual reality systems allow a user to handle and manipulate the controls of complicated and expensive vehicles and machinery. More specifically, a pilot or astronaut in training can operate a fighter aircraft or spacecraft by manipulating controls such as a control joystick and other buttons and view the results of controlling the aircraft on a virtual reality simulation of the aircraft in flight. In yet other applications, a user can manipulate objects and tools in the real world, such as a stylus, and view the results of the manipulation in a virtual reality world with a "virtual stylus" viewed on a screen, in 3-D goggles, etc.

For virtual reality systems to provide a realistic (and therefore effective) experience for the user, sensory feedback and manual interaction should be as natural as possible. As virtual reality systems become more powerful and as the number of potential applications increases, there is a growing need for an increased number of specific human/computer haptic interface devices or systems, which are specifically configured for a specific application (e.g. pilot, military or vehicle driving training). However, the availability of a number of specific human/computer haptic interface devices or systems is often inhibited by a number of technical and economic factors.

SUMMARY OF THE INVENTION

In accordance with the present invention, it has been recognized that there is a need for a distributed haptic interface system and method which can be readily reconfigured for use in a variety of different virtual reality applications.

In accordance with principles of the present invention, a reconfigurable haptic interface system and method is set forth. In one aspect of the present invention, the reconfigurable haptic interface system includes at least one sensory communicator or pod that is adapted to be removeably mounted on a portion of an object. In one aspect of the present invention, the at least one pod can be removeably mounted on a moveable object, such as a human test subject, which permits the haptic interface system to be readily adjusted or reconfigured for a number of virtual reality applications. At least one actuator is associated with the at least one pod and is adapted to communicate with the portion of the moveable object (e.g. portion of the human test subject) on which the pod is disposed. In one aspect, the at least one actuator includes at least one of a vibrator, plunger, solenoid, shocker or sensory communicator. In another embodiment, the haptic interface includes a plurality of reconfigurable pods. Thus, the haptic interface is provided as a reconfigurable, distributed haptic interface.

The system also includes a plurality of transmitter/receiver units mounted in a position that defines a spatial frame of reference and enables the plurality of transmitter/receiver units to communicate with the at least one pod. The plurality of transmitter/receiver units detect and communicate relative position information of the at least one pod to a host computer. The host computer processes the relative position information received from the at least one pod to control actuation of the at least one actuator associated with the at least one pod.

The at least one pod further includes a unique identifier, which permits the host computer to correlate the relative position information to the at least one pod. The at least one pod further includes a tracker module, which is adapted to communicate the relative position information to the plurality of transmitter/receiver units. An interface module is also included on the at least one pod and is operative to provide a communications interface to the pod. In addition, the at least one pod includes a processor, which is operative to process a plurality of information received, via the interface. The processor is further operative to transmit processed information, via the interface.

The system further includes a pod base station. The pod base station may be coupled to the at least one pod and to the host computer. The pod base station is adapted to receive and translate a plurality of instructions from the host computer into control signals, which are provided to the at least one pod.

In another aspect of the present invention, a method of operating a haptic interface system includes mounting at least one removeable pod on a first portion of a moveable object, for example, the arm portion of the human test subject. The first portion of the moveable object can be moved within a plurality of virtual predetermined regions that include virtual safety or general regions and at least one virtual danger region. As the first portion of the moveable object is moved within the plurality of virtual predetermined regions, the pod can periodically communicate position information to the host computer, via the plurality of transmitter/receiver units.

The host computer processes the position information to generate a plurality of control instructions, which can be communicated to the pod, via the pod base station. The host computer further processes the position information to determine if the first position information represents the first portion of the moveable object being located in the virtual safety or general region or in at least one virtual danger region of a plurality of virtual regions. If the host computer determines that the first portion of the moveable object, which is carrying the pod, is located in the at least one virtual danger region of the plurality of regions, the host computer generates an actuation control instruction. The actuation control instruction is translated into an actuation control signal by the pod base station and the control signal is communicated to an actuator associated with the pod. The actuator responds to receipt of the actuation control signal provided by the base station, by actuating to communicate with the portion of the moveable object (e.g. an arm portion of the human test subject on which the pod is disposed).

The method of operating the distributed haptic interface system further includes removing the at least one removeable pod from the first portion of the moveable object. Thereafter, the pod can be re-mounted on a second portion of the moveable object. For example, the pod can be re-mounted on a leg portion or back portion of the human test subject. Thereafter, the distributed haptic interface system having principles of the present invention can by employed to monitor position of the leg portion or back portion of the human test subject and to provide a haptic interface or force feedback to the leg portion or back portion of the human test subject, via one or more actuators associated with the removeably mounted pod.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

Figure 1:
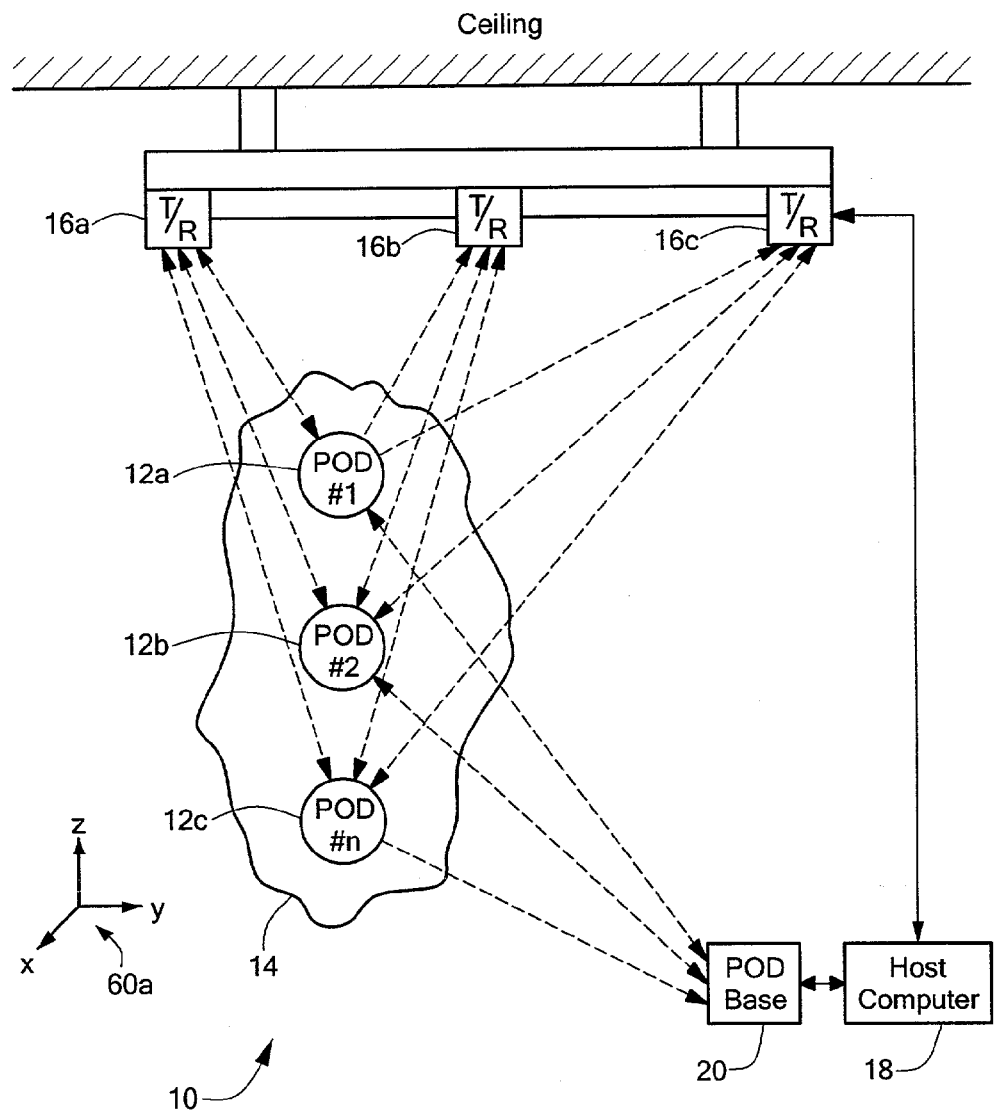
FIG. 1 is an exemplary high-level functional block diagram of a distributed haptic interface system according to the present invention.

Referring to FIG. 1, an exemplary embodiment of a distributed haptic interface system 10 includes a plurality of sensory communicators or pods, 12a, 12b, 12c (hereinafter collectively referred to as "pods 12"), which are removeably mounted on a plurality of portions of a compliant moveable object 14. The pods 12 can include a number of position and/or orientation sensors, which each include an actuator adapted to communicate sensory information to the moveable object, which will be described in detail herein. The movable object can be moved, for example, along the axes of a three-dimensional Cartesian coordinate system 60a. The system 10 further includes a plurality of transmitter/receiver units 16a, 16b, 16c (hereinafter collectively referred to as "transmitter/receiver units 16"), which are mounted in a fixed position and in a communication relationship with the pods 12. In one exemplary embodiment, the plurality of transmitter/receiver units 16 can include an IS-600 Mark 2 Plus Precision Motion Tracker, which can be provided by InterSense of Burlington, Mass.

A host computer system 18 is coupled to the plurality of transmitter/receiver units 16 and to the plurality of pods 12, via a pod base station 20. The plurality of transmitter/receiver units 16 are adapted to detect and communicate relative position information of the plurality of pods 12 to the host computer 18. The host computer 18 is adapted to receive the relative position information related to the plurality of pods 12 from the plurality of transmitter/receiver units 16 and to process the relative position information related to the plurality of pods 12 to control actuation of one or more actuators 22 (FIG. 2) that are incorporated on each of the plurality of pods 12, which will be described in further detail below.

The base station 20, which is coupled between the host computer 18 and each of the pods 20, operates to receive a plurality of instructions from the host computer 18 and to translate the plurality of instructions received from the host computer 18 into a corresponding plurality of control signals. The base station 20 communicates the plurality of control signals to one or more particular pods 12a, 12b, 12c of the plurality of pods 12 to control various attributes thereof. The communication of the plurality of control signals from the base station 20 to the pods 12 may also include information defining which actuator of a number of actuators included on each of the pods 12 to actuate. Further, the control signals communicated from the base station 20 to the pods 12 may include parameters associated with the actuation. For example, the base station 20 can provide a control signal to pod 12a to instruct an actuator, such as a vibrating motor associated therewith, to vibrate at a frequency of 18 Hz for 250 msec, pause for a moment and vibrate again at a frequency of 28 Hz for 600 msec. Other various attributes of the plurality of pods 12, which are controlled by the plurality of control signals communicated from the base station 20, can include the rate or frequency for which the plurality of pods 12 communicate updated position information to the plurality of transmitter/receiver units 16.

Figure 2:
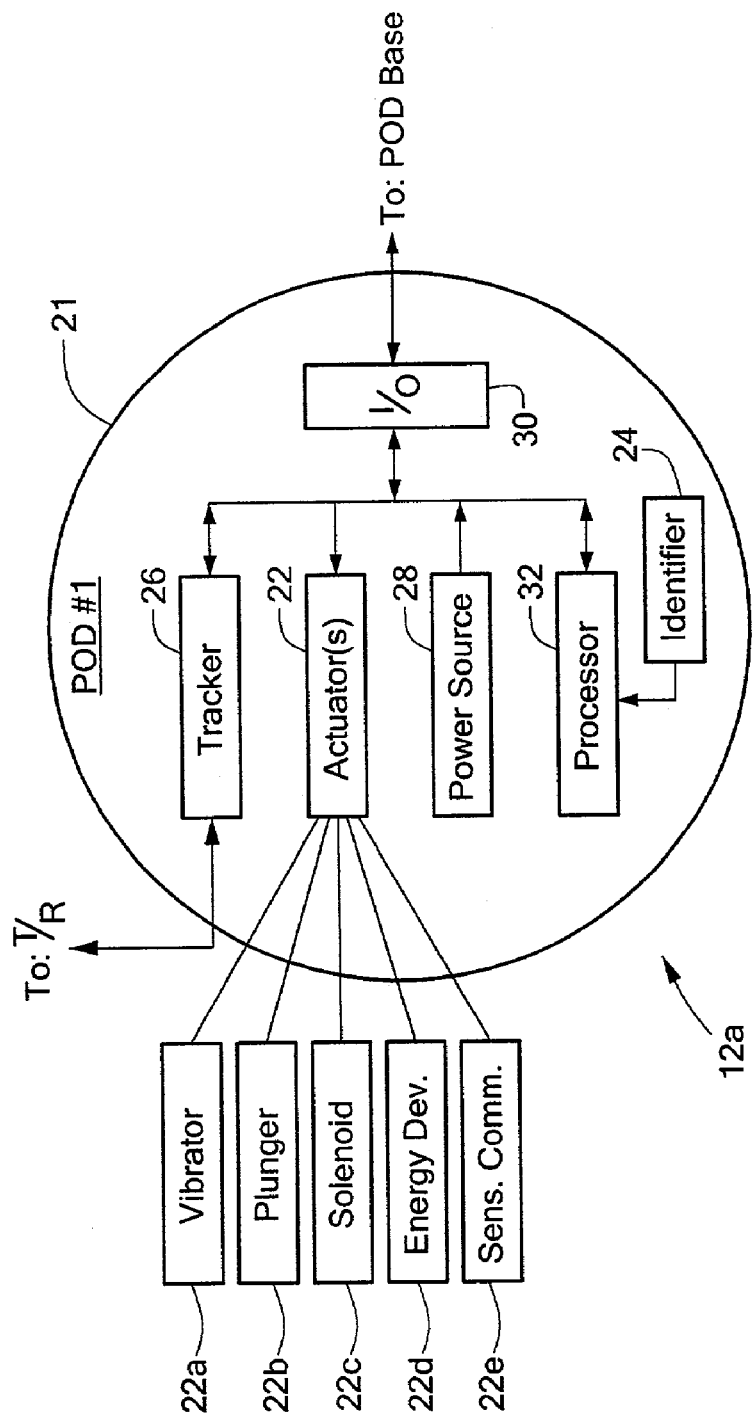
FIG. 2 is an exemplary expanded schematic block diagram of one of the plurality of pods incorporated on the system of FIG. 1.

Referring to FIG. 2, in order to simplify the description of the plurality of pods 12, shown is an expanded view of pod 12a, and it should be understood that the remaining pods 12b and 12c are similarly constructed and arranged. The pod 12a, which is adapted to be removeably mounted on a portion of the moveable object 14, includes a housing 21, which incorporates the one or more actuators 22, as described above. In the exemplary embodiment, the one or more actuators 22 incorporated in the housing 21 of the pod 12a are disposed to communicate with a portion of the moveable object 14 on which the pod 12a is disposed.

For example, the one or more actuators 22 can include a vibrator 22a, plunger 22b, solenoid 22c or energy storage device 22d. The vibrator 22a incorporated in the housing 21 of the pod 12a, as the actuator 22, can be controlled to communicate a vibration sensation or force to the portion of the moveable object 14 on which the pod 12a is disposed. Similarly, the plunger 22b or solenoid 22c incorporated in the housing 21 of the pod 12*a*, as the actuator 22, can be controlled to communicate a strike or tap force to a surface of the portion of the moveable object 14 on which the pod 12*a* is disposed. Furthermore, the energy storage device incorporated in the housing 21 of the pod 12*a*, as the actuator 22, can be controlled to communicate a shock to the surface of the portion of the moveable object 14 on which the pod 12*a* is disposed. In another example, the one or more actuators 22 can include a sensory communicator 22*e*, such as a temperature communicator that can be controlled to communicate a hot, warm or cold temperature sensation to the surface portion of the moveable object 14 on which the pod 12*a* is disposed.

In the exemplary embodiment, the pod 12*a* includes a unique identifier 24, which permits the host computer 18 to identify the particular pod 12*a* by reading the unique identifier 24. The unique identifier 24 further permits the host computer 18 to correspond particular position information with the particular pod 12*a* having the unique identifier 24. The unique identifier 24 of the pod 12*a*, for example, can include a unique serial number having alpha, numeric or alpha-numeric characters. In another example, the unique identifier 24 of the pod 12*a* can include a predetermined code name, having characters to provide descriptive information relating to the type of actuator (e.g. vibrator 22*a*, plunger 22*b*, solenoid 22*c*, energy storage device 22*d*, sensory communication 22*e* or other) incorporated on the pod 12*a*, as well as to provide descriptive information relating to the relative location or position of the pod 12*a* on the portion of the moveable object 14.

The pod 12*a* further includes a tracker module 26, power source 28, interface module 30 and a processor 32. The tracker module 26 is adapted to communicate the relative location or position of the pod 12*a*, which is removeably mounted on the portion of the moveable object 14, to the plurality of transmitter/receiver units 16. The power source 28 is coupled to the various components and/or modules of the pod 12*a* and provides power thereto. The power source 28, for example, can be a rechargeable energy storage device or a battery. The interface module 30 is operative to provide an interface to the pod 12*a* to enable the host computer 18 to communicate back and forth between itself and the pod 12*a*, via the base station 20. The processor 32 is operative to read and interpret the pod identifier 24, as well as to receive and process a plurality of instructions and/or control signals from the host computer 18, via the interface 20. The processor is further operative to transmit processed information back to the host computer 18, via the base station 20.

Figure 3:
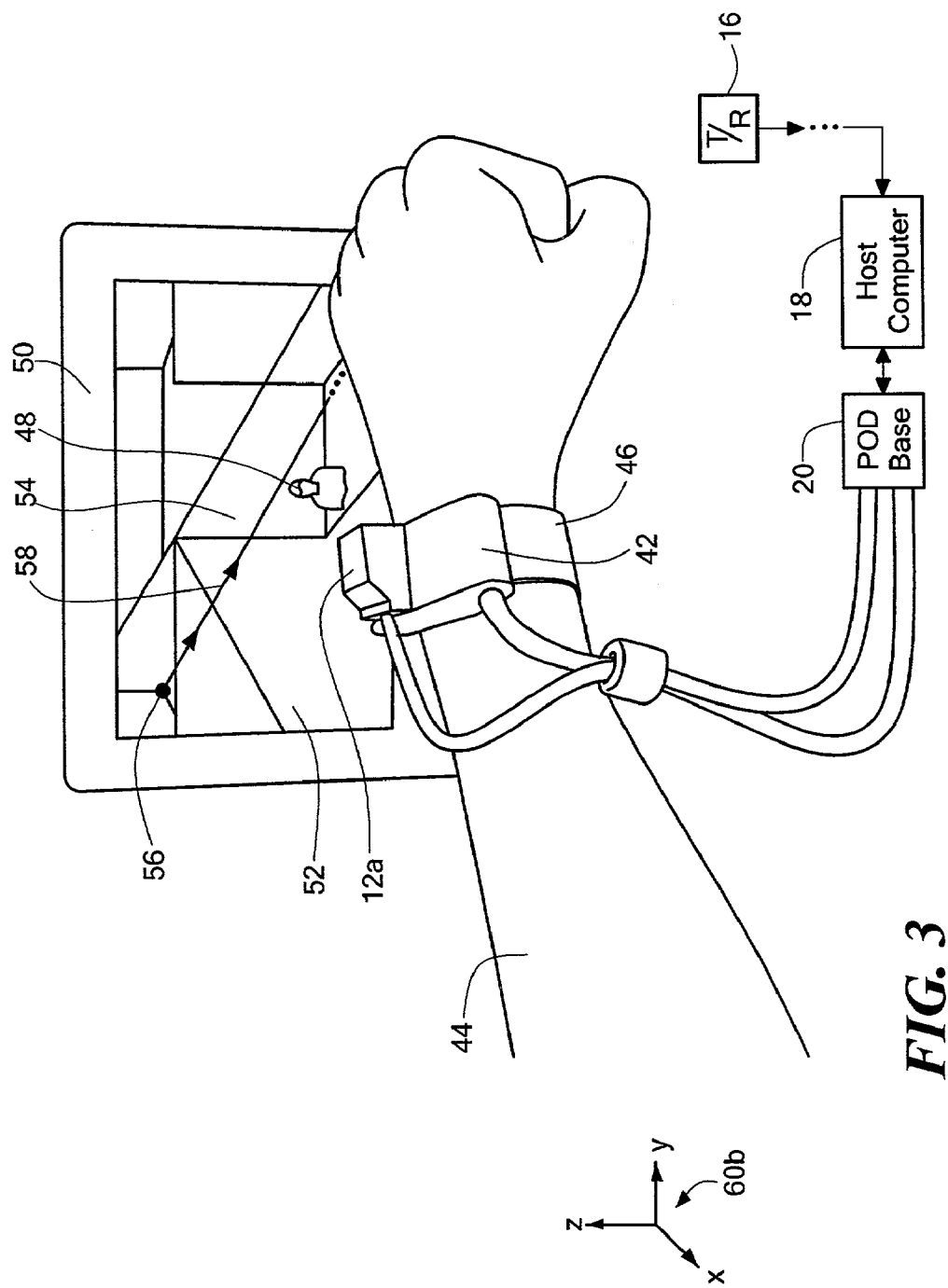
FIG. 3 is one exemplary embodiment illustrating the distributed haptic interface system of FIG. 1.

Referring to FIG. 3, in one exemplary embodiment, the pod 12*a* is coupled to the pod base station 20, via one or more hard-wired data communication buses 40*a* and 40*b*. Furthermore, the pod 12*a* is releasably coupled to the wrist region 42 of a human test subject 44 by a releasable coupling member, such as a wrist strap 46. In this embodiment, the human test subject 44 represents the moveable object 14, as described above in connection with FIG. 1. It should be understood that a plurality of other coupling members can be substituted for the wrist strap to permit the pod 12*a* to be releasably coupled to the wrist region 42 or other location of the human test subject 44. In an embodiment the plurality of other releasable coupling members can include, but are not limited to straps with buckles (e.g. metal, plastic, or other materials), straps with snap closures, straps with button closures, straps with zipper closures, straps with velcro closures, straps with hook and loop closures, straps that are tied, for which any of the preceding straps of the releasable coupling members can include elastic straps. Yet further, the releasable coupling members can include, but are not limited to elastic straps/bands securely positioned over the pod, elastic straps/bands secured under the pod, Velcro, hook and loop, snaps, clips onto clothing, clips onto skin, buttons, zippers inserted into a plurality of pockets on the user's clothing, reusable adhesive, tied with string, rope, cable, etc., suction cups, clamps that hold onto the body part, compressed between the body part and an object, such as a chair or other immobile structure and/or woven into body hair.

In this embodiment, the relative motion of the pod 12*a*, which is releasably coupled to the wrist region 42 of the human test subject 44, can be represented by the icon test subject 48 located on a liquid crystal display ("LCD") display 50. It should be understood that other display methods can be employed to display the icon test subject and other surrounding environments, such as a cathode ray tube ("CRT"), or an immersive "head-mounted display" head gear assembly. In the exemplary embodiment, the LCD display 50 can further include a plurality of safety or general regions 52 and at least one danger region 54. The at least one danger region 54 can be associated with a hostile icon 56. The hostile icon 56 includes a line of sight 58 that extends into the danger zone 54.

In this arrangement, the relative motion of the pod 12*a*, which is releasably coupled to the wrist region 42 of the human test subject 44, can be moved along the axes of a three-dimensional Cartesian coordinate system 60*b*, which transposes similar motion to the icon test subject 48 located on the LCD display 50. If the host computer 18 receives position information, via the transmitter/receiver unit 16, indicating that the icon test subject 48 has moved to a position in the danger region 54 and within the line of sight 58 of the hostile icon 56, the host computer 18 communicates a control signal to the pod 12*a*, via the base station 18. The control signal can include an actuation signal that controls the actuator 22 (FIG. 2) incorporated on the pod 12*a* to actuate for communicating with the wrist region 42 of the human test subject 44.

Figure 4:
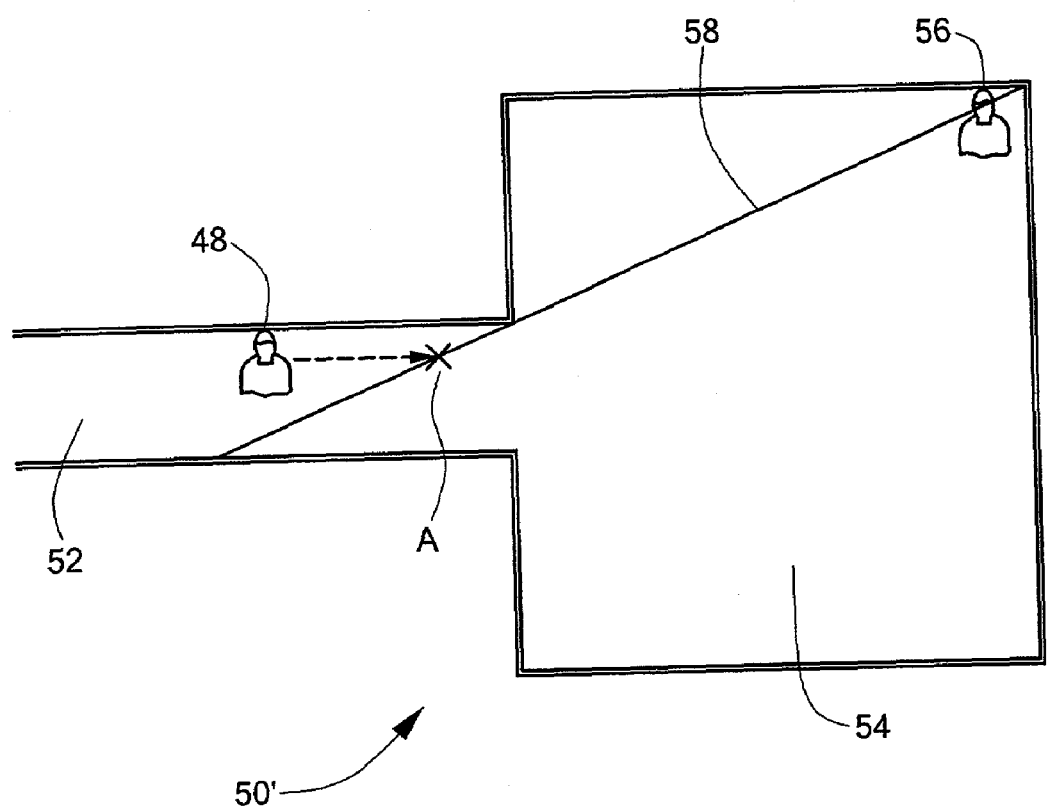
FIG. 4 is an expanded plan view illustrating features of the exemplary embodiment of FIG. 3.

Referring further to FIG. 4, a plan view of a portion of the LCD 50 is shown depicting the human test subject icon 48, the hostile icon 56 and associated line of sight 58 extending into at least one danger region 54 and a portion of the plurality of general regions 52. As similarly described above, if the human test subject icon 48 enters the danger zone 54 and enters the line of sight 58 of the hostile icon 56 at point "A", for example, the host computer 20 will communicate with the pod 12*a*, as described above, to actuate the actuator 22 of the pod 12*a* to communicate with the wrist region 42 of the human test subject 44.

Figure 5:
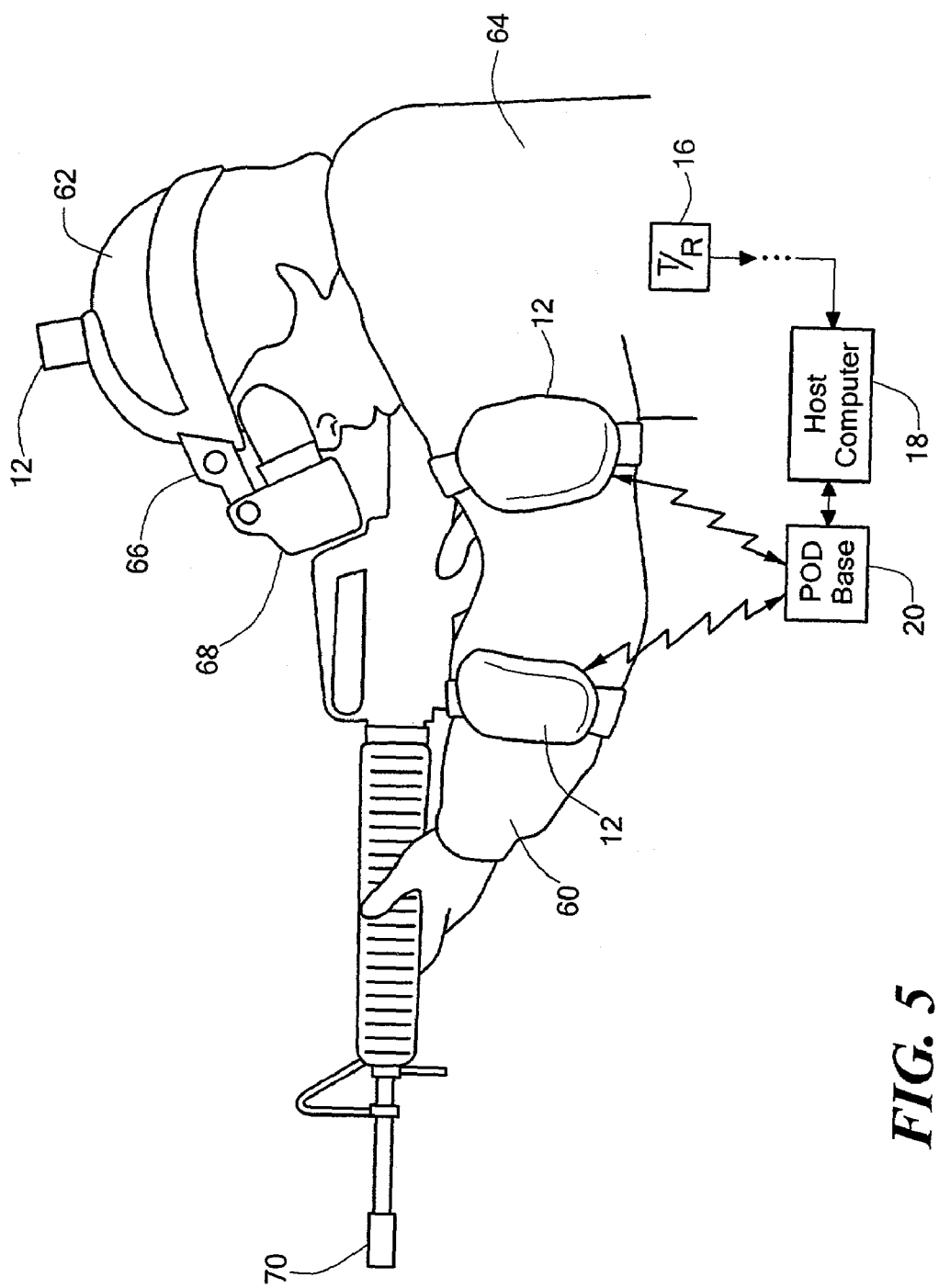
FIG. 5 is another exemplary embodiment illustrating the distributed haptic interface system of FIG. 1.

Referring to FIG. 5, in another exemplary embodiment, a plurality of reconfigurable pods 12 are coupled to the pod base station 20, via a wire-less communication link. In this embodiment, the plurality of pods 12, are releasably coupled to portions of an arm 60 and head 62 of a human test subject 64. In this embodiment, the human test subject 64 represents the moveable object 14, as described above in connection with FIG. 1 and the pods 12 are disposed on the human test subject 64 so that certain motions of the human test subject 64 can be tracked and monitored.

The relative motion of the pods 12 can be represented to the human test subject 64 by a plurality of groups of predetermined images (not shown) presented to the human test subject 64, via a video display head gear assembly 66. The haptic display head gear assembly 66 is adapted to be securely mounted on the head 62 of the human test subject 64 and to position a video display 68 incorporated on the head gear assembly 66 within view of the human test subject 64. Although not shown in the figures, the plurality of images presented to the human test subject 64, via the video display head gear assembly 66, represents a number of virtual obstacles that the human test subject 64 may encounter. For example, one group of video images of the plurality of groups of video images can include soldier training images that portray a number of combat situations, where the human test subject 64 is required to carry a weapon 70 while performing predetermined maneuvers without detection, capture, or elimination.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A distributed haptic interface system, comprising:
   at least one pod adapted to be removeably mounted on any one of a plurality of portions of a moveable object;
   at least one actuator associated with the at least one pod and being adapted to communicate with any one of the plurality of portions of the moveable object; and
   a plurality of transmitter/receiver units mounted in a position defining a spatial frame of reference and in a communication relationship with the at least one pod, wherein the plurality of transmitter/receiver units detect and communicate relative position information of the at least one pod to a host computer and wherein the host computer processes the relative position information of the at least one pod to control actuation of the at least one actuator.

2. The distributed haptic interface system of claim 1, wherein the at least one pod further includes a unique identifier.

3. The distributed haptic interface system of claim 2, wherein the at least one pod further includes a tracker module adapted to communicate the relative position information to the host computer via the plurality of transmitter/receiver units.

4. The distributed haptic interface system of claim 3, wherein the at least one pod further includes an interface module that is operative to provide a communications interface to the pod.

5. The distributed haptic interface system of claim 4, wherein the at least one pod further includes a processor operative to process a plurality of information received via the interface and to transmit processed information via the interface.

6. The distributed haptic interface system of claim 1, wherein the at least one actuator includes at least one of a vibrator, plunger, solenoid, shocker or sensory communicator.

7. The distributed haptic interface system of claim 1, wherein the at least one pod includes means for releasably mounting the at least one pod on any one of the plurality of portions of the moveable object.

8. The distributed haptic interface system of claim 1, further including a pod base station coupled to the at least one pod and to the host computer, the pod base station being adapted to receive and translate a plurality of instructions from the host computer into control signals which are provided to the at least one pod.

9. A method of operating a haptic interface, comprising:
   mounting at least one removeable pod on a first portion of a moveable object;
   moving the first portion of the moveable object within a plurality of virtual predetermined regions;
   communicating first position information of a plurality of position information associated with the first portion of the moveable object from the at least one removeable pod to a host computer; and
   processing the first position information of the plurality of position information at the host computer to generate a first control instruction of a plurality of control instructions,
   wherein processing the first position information of the plurality of position information at the host computer comprises determining if the first position information of the plurality of position information represents the first portion of the moveable object being located in at least one virtual danger region of the plurality of virtual predetermined regions.

10. The method of claim 9, wherein processing the first position information of the plurality of position information at the host computer further includes:
    generating an actuation control instruction of the plurality of control instructions if the host computer determines that the first portion of the moveable object is located in the at least one virtual danger region of the plurality of predetermined regions; and
    communicating the first control instruction of the plurality of control instructions to an actuator associated with the at least one removeable pod for actuating the actuator to communicate with the first portion of the moveable object.

11. The method of claim 10, wherein actuating the actuator to communicate with the first portion of the moveable object includes the actuator vibrating proximate to the first portion of the moveable object.

12. The method of claim 10, wherein actuating the actuator to communicate with the portion of the moveable object includes actuating a plunger of the actuator to strike the first portion of the moveable object.

13. The method of claim 10, wherein actuating the actuator to communicate with the portion of the moveable object includes actuating an energy storage device of the actuator to shock the first portion of the moveable object.

14. The method of claim 9, further including:
    removing the at least one removeable pod from the first portion of the moveable object;
    re-mounting the at least one removeable pod on a second portion of the moveable object;
    moving the second portion of the moveable object within the plurality of virtual predetermined regions;
    communicating second position information of the plurality of position information associated with the second portion of the moveable object from the at least one removeable pod to the host computer; and
    processing the second position information of the plurality of position information at the host computer to generate a second control instruction of the plurality of control instructions.

15. The method of claim 14, wherein processing the second position information of the plurality of position information at the host computer further includes:
    determining if the second position information of the plurality of position information represents the second portion of the moveable object being located in at least one virtual danger region of the plurality of virtual predetermined regions.

16. The method of claim 15, wherein processing the second position information of the plurality of position information at the host computer further includes:
   generating an actuation control instruction of the plurality of control instructions if the host computer determines that the second portion of the moveable object is located in the at least one virtual danger region of the plurality of predetermined regions; and
   communicating the actuation control instruction of the plurality of control instructions to an actuator associated with the at least one removeable pod for actuating the actuator to communicate with the second portion of the moveable object.

17. The method of claim 16, wherein actuating the actuator to communicate with the second portion of the moveable object includes the actuator vibrating proximate to the second portion of the moveable object.

18. The method of claim 16, wherein actuating the actuator to communicate with the portion of the moveable object includes actuating a plunger of the actuator to strike the second portion of the moveable object.

19. The method of claim 16, wherein actuating the actuator to communicate with the portion of the moveable object includes actuating an energy storage device of the actuator to shock the second portion of the moveable object.

20. A method of operating a haptic interface, comprising:
   mounting at least one removeable pod on a first portion of a moveable object;
   moving the first portion of the moveable object within a plurality of virtual predetermined regions;
   communicating first position information of a plurality of position information associated with the first portion of the moveable object from the at least one removeable pod to a host computer;
   processing the first position information of the plurality of position information at the host computer to generate a first control instruction of a plurality of control instructions;
   removing the at least one removeable pod from the first portion of the moveable object;
   re-mounting the at least one removeable pod on a second portion of the moveable object;
   moving the second portion of the moveable object within the plurality of virtual predetermined regions;
   communicating second position information of the plurality of position information associated with the second portion of the moveable object from the at least one removeable pod to the host computer; and
   processing the second position information of the plurality of position information at the host computer to generate a second control instruction of the plurality of control instructions,
   wherein processing the second position information of the plurality of position information at the host computer comprises determining if the second position information of the plurality of position information represents the second portion of the moveable object being located in at least one virtual danger region of the plurality of virtual predetermined regions.

21. The method of claim 20 wherein processing the second position information of the plurality of position information at the host computer comprises:
   generating an actuation control instruction of the plurality of control instructions if the host computer determines that the second portion of the moveable object is located in the at least one virtual danger region of the plurality of predetermined regions; and
   communicating the actuation control instruction of the plurality of control instructions to an actuator associated with the at least one removeable pod for actuating the actuator to communicate with the second portion of the moveable object.

22. The method of claim 21 wherein actuating the actuator to communicate with the second portion of the moveable object comprises the actuator vibrating proximate to the second portion of the moveable object.

23. The method of claim 21 wherein actuating the actuator to communicate with the portion of the moveable object comprises actuating a plunger of the actuator to strike the second portion of the moveable object.

24. The method of claim 21 wherein actuating the actuator to communicate with the portion of the moveable object comprises actuating an energy storage device of the actuator to shock the second portion of the moveable object.

* * * * *

UNITED STATES PATENT AND TRADEMARK OFFICE
CERTIFICATE OF CORRECTION

PATENT NO. : 7,082,570 B1 Page 1 of 1
APPLICATION NO. : 10/230850
DATED : July 25, 2006
INVENTOR(S) : von Wiegand et al.

It is certified that error appears in the above-identified patent and that said Letters Patent is hereby corrected as shown below:

Column 3, line 30, delete "can by" and replace with --can be --.

Column 3, line 31, delete "monitor position" and replace with --monitor positions--.

Column 5, line 60, delete "embodiment the" and replace with --embodiment, the--.

Signed and Sealed this

Ninth Day of January, 2007

JON W. DUDAS
*Director of the United States Patent and Trademark Office*